United States Patent [19]

Brooks

[11] 4,034,615

[45] July 12, 1977

[54] ENDLESS POWER TRANSMISSION BELT

[75] Inventor: Alden W. Brooks, Springfield, Mo.

[73] Assignee: Dayco Corporation, Dayton, Ohio

[21] Appl. No.: 718,294

[22] Filed: Aug. 27, 1976

[51] Int. Cl.$^2$ .................. F16H 7/00; F16G 5/00
[52] U.S. Cl. .................................. 74/229; 74/234
[58] Field of Search ............ 24/234, 233, 237, 229

[56] References Cited

U.S. PATENT DOCUMENTS 3,964,328  6/1976  Redmond, Jr. ................ 74/234 X

Primary Examiner—Leonard H. Gerin
Attorney, Agent, or Firm—Reuben Wolk

[57] ABSTRACT

A toothed elastomeric endless power transmission belt for operation in an endless path around associated sheaves with minimum noise is provided and comprises a compression section having a plurality of teeth defined by a plurality of grooves in the compression section extending at an angle other than 90° to the endless path with the grooves defining teeth which are adapted to enter and exit each of the associated sheaves gradually during belt operation and the grooves defining associated air-filled columns each of which due to its angular disposition is gradually covered and exposed as the column respectively enters and exits each of the associated sheaves during belt operation resulting in the minimum noise.

20 Claims, 6 Drawing Figures

U.S. Patent  July 12, 1977  4,034,615
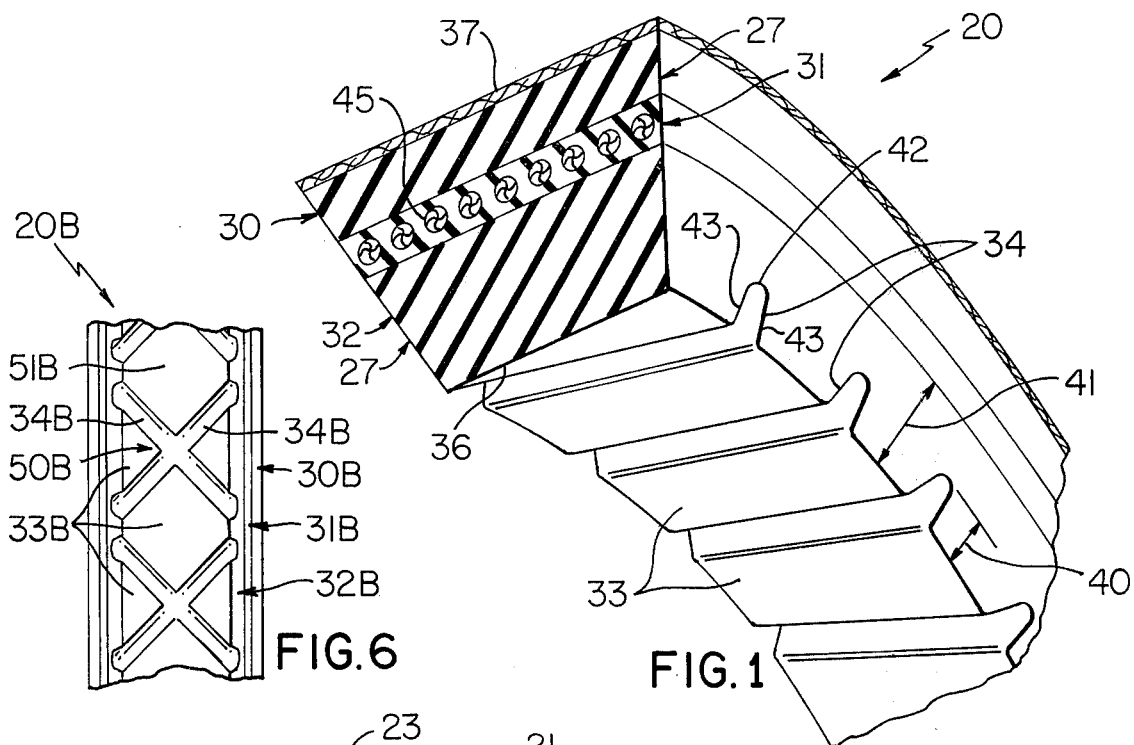
FIG. 1
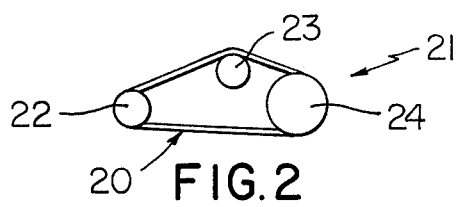
FIG. 2
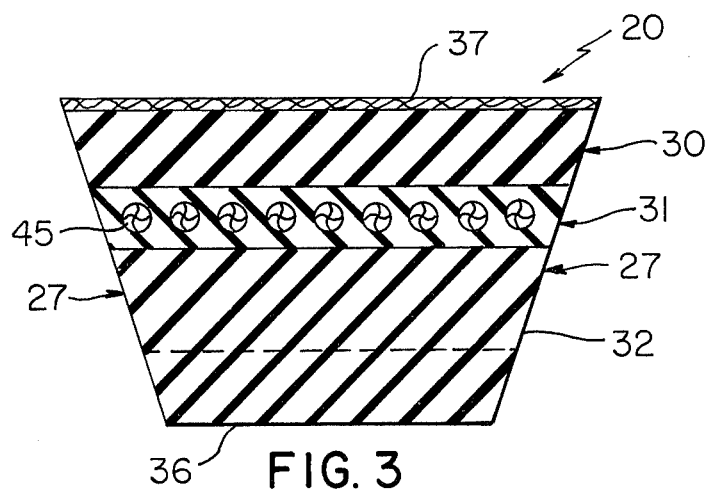
FIG. 3
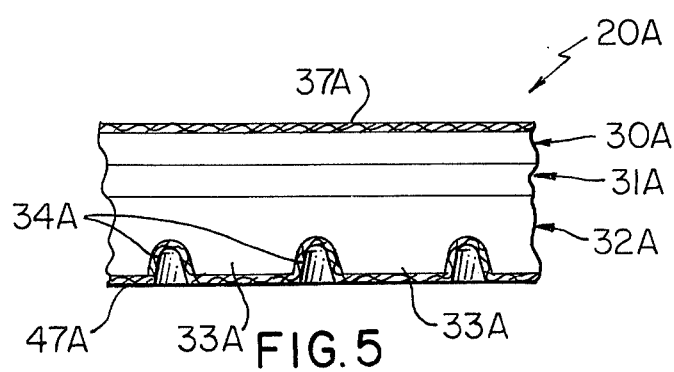
FIG. 5
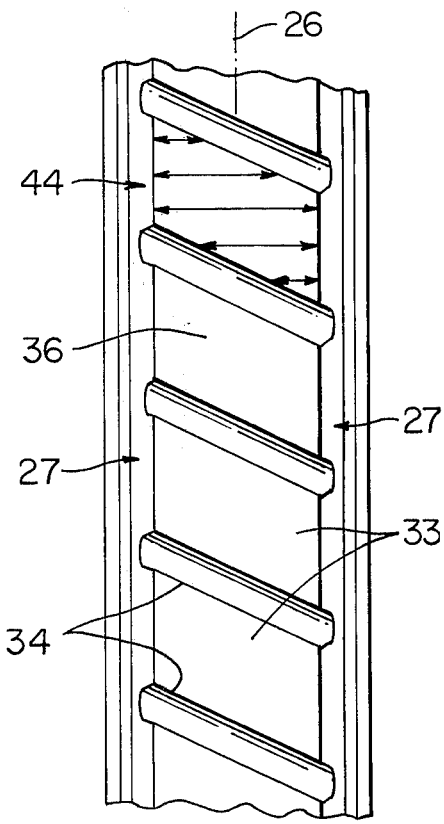
FIG. 4
FIG. 6

ENDLESS POWER TRANSMISSION BELT

BACKGROUND OF THE INVENTION

Toothed elastomeric endless power transmission belts are well known and widely used in industry due to their high flexibility and sheave-engaging surfaces of maximum area which enable greater power transmission. However, each of such toothed belts is very noisy during operation because it produces a "siren-like" noise caused by the abrupt manner in which the teeth thereof enter and exit associated sheaves and by grooves containing air columns which also enter and exit the associated sheaves in an abrupt manner.

SUMMARY

It is a feature of this invention to provide a toothed elastomeric endless power transmission belt of simple and economical construction which is substantially noiseless during operation thereof around associated sheaves.

Another feature of this invention is to provide a toothed belt of the character mentioned having a substantially trapezoidal cross-sectional outline.

Another feature of this invention is to provide an endless belt of the character mentioned having teeth of various configurations comprising its compression section and wherein such teeth are defined by grooves in the compression section which extend at an angle other than 90° to the endless path of the belt.

Another feature of this invention is to provide a belt of the character mentioned which comprises a compression section having a plurality of teeth therein defined by a plurality of grooves in the compression section extending at an angle other than 90° to the endless path of the belt with the grooves defining teeth which enter and exit associated sheaves gradually during belt operation and the grooves defining associated air-filled columns each of which due to its angular disposition is gradually covered and exposed as the column respectively enters and exits each of its associated sheaves during belt operation resulting in minimum noise.

Accordingly, it is an object of this invention to provide an endless power transmission belt having one or more of the novel features set forth above or hereinafter shown or described.

Other details, features, objects, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross section and parts broken away illustrating one exemplary embodiment of the endless power transmission belt of this invention;

FIG. 2 is a schematic view illustrating the belt of FIG. 1 utilized in a typical drive system comprised of a plurality of sheaves;

FIG. 3 is a cross-sectional view of the belt of FIG. 1 taken perpendicular to its endless path;

FIG. 4 is a bottom view of a straight section of the belt of FIG. 1;

FIG. 5 is a fragmentary view looking at the side of a straight section of another exemplary embodiment of the belt of this invention; and FIG. 6 is a view similar to FIG. 4 illustrating another exemplary embodiment of the belt of this invention.

DESCRIPTION OF ILLUSTRATED EMBODIMENTS

Reference is now made to FIGS. 1 and 2 of the drawing which illustrate one exemplary embodiment of a toothed elastomeric endless power transmission belt of this invention which is designated generally by the reference numeral 20; and, the belt 20 is particularly adapted for operation in an endless path around associated sheaves with minimum noise due to its unique construction which will be described in detail subsequently. The belt 20 is particularly adapted to be operated in an endless path in an exemplary system 21 as shown in FIG. 2 and in a manner which is well known in the art between a driving sheave 22 and a plurality of driven sheaves 23 and 24 yet the belt 20 has optimum flexibility due to its toothed configuration while providing noiseless operation during its operation around the sheaves 22, 23, and 24.

As best seen in FIG. 3, the belt 20 of this example is a trapezoidal toothed belt, i.e., such belt has a trapezoidal cross-sectional configuration when viewed at any cross section thereof perpendicular to the endless path or longitudinal axis 26 of such belt; and, the non-parallel sides 27 of the belt 20 of this example are in the form of raw-edged sides or sides which are free of covers, or the like.

The belt 20 is made primarily of a suitable elastomeric material which in this disclosure of the invention is shown as rubber by cross-hatching in the drawing; and, such belt comprises a tension section 30, a load-carrying section 31, and a compression section 32. The compression section 32 has a plurality of substantially identical teeth 33 defined by a plurality of grooves 34 in such compression section with the grooves 34 extending at an angle other than 90° to the endless path or longitudinal axis 26 of the belt 20, see FIG. 4. The grooves 34 define the teeth 33 and such teeth are adapted to enter associated sheaves gradually, such as the sheaves 22, 23, and 24 of system 21, for example, during belt operation and the grooves define associated air-filled columns each of which is also designated by the reference numeral 34. Each of the air-filled columns 34 due to its angular disposition is gradually covered and exposed as the column respectively enters and exits each of its associated sheaves during belt operation. The cooperating action of gradual entry and exit of each tooth and gradual covering and exposing of each air-filled column as each tooth 33 and air-filled column 34 respectively enter and exit an associated sheave results in the belt 20 operating with minimum noise and without the siren-like noise which is the characteristic of toothed belts in which the teeth are defined by grooves perpendicular to their longitudinal axes.

The trapezoidal belt 20 has its entire inside surface defined as a raw-edged surface 36 or an inside surface which is free of covers; and such belt has an outside surface defined as a fabric-covered surface 37 which in this example is shown covered by a woven fabric 37.

As seen in FIG. 1 each of the grooves 34 extends inwardly from the inside surface 36 a distance 40 which is a fractional part of the height or thickness 41 of the compression section 32; and, in this example the distance 40 is approximately one-half the thickness 41. Each of the grooves 34 is a substantially U-shaped groove defined by a roughly semi-cylindrical surface 42 defining the bight of such groove and the semi-cylindrical surface 42 is adjoined at opposite edges thereof by a pair of roughly planar parallel surfaces each designated by the same reference numeral 43.

As best seen in FIG. 4, each of the teeth 33 of the belt 20 has a roughly rhomboidal-shaped surface which comprises the inside surface 36 of the belt 20. The grooves 34 define such teeth so that each tooth 33 gradually increases in width and then gradually decreases in width along the endless path 26 and such gradual increase and decrease in width of each tooth is highlighted by the lengths of five spaced double arrows as shown at 44.

The grooves 34 in the compression section 32 of the belt 20 are of equal size and configuration and extend at an angle of roughly 60° with the endless path 26 and completely across such compression section and it will be seen that the teeth 33 defined by such grooves 34 are also of equal size and configuration. In addition, the teeth 33 of the belt 20 have a given pitch along the endless path or axis 26 of such belt.

The load-carrying section 31 of the belt 20 may be provided with suitable load-carrying or strength members; however, in this example such section is provided with a suitable helically wound load-carrying cord 45. The cord 45 may be made of any material commonly used in the art for this purpose.

Other exemplary embodiments of the belt of this invention are illustrated in FIGS. 5 and 6 of the drawing. The belts illustrated in FIGS. 5 and 6 are similar to the belt 20; therefore, such belts will be designated by the reference numeral 20A and 20B respectively and representative parts of each belt which are similar to corresponding parts of the belt 20 will be designated in the drawings by the same reference numerals as in the belt 20 (whether or not such representative parts are mentioned in the specification) followed by an associated letter designation either A or B and not described again in detail. Only those component parts of each belt 20A and 20B which are different from corresponding parts of the belt 20 will be designated by a new reference numeral also followed by the associated letter designation and described in detail.

The belt 20A has a tension section 30A, a load-carrying section 31A, and a compression section 32A. In addition, the belt has a fabric cover 37A defining its outside surface. The only difference between the belt 20A and the belt 20 is that the belt 20A instead of having an inside surface free of a cover has a fabric cover 47A over each tooth 33A and defining each groove 34A as a fabric-lined groove whereby the cover 47A defines the entire inside surface of the belt 20A.

The belt 20B of FIG. 6 has a tension section 30B, load-carrying section 31B, and compression section 32B and teeth 33B including main centrally disposed teeth and what may be considered side teeth all defined by grooves 34B; however, the grooves 34B are disposed as pairs of intersecting grooves wherein each groove 34B of each pair extends completely across the compression section 32B and the grooves 34B of each pair intersect at roughly 45° to the longitudinal axis 26B in an X pattern as indicated at 50B. The side teeth 33B defined by the X pattern of the grooves 34B have a triangular pattern and the main central teeth have what may be considered a diamond shape when looking perpendicular to the inside surface of the belt 20B and such main central teeth have roughly diamond-shaped surface 51B which together with the triangular surface of the side teeth comprises the inside surface of such belt.

Reference was made in this disclosure to the fact that the plurality of grooves in the compression section extend at an angle other than 90° to the endless path of the belt. Based on overall belt manufacturing experience it is believed desirable to provide grooves so that each is disposed at an angle ranging between 30° and 75° to the endless path or longitudinal axis of the belt. This angular relationship is believed desirable regardless of whether the grooves extend in spaced parallel relation, an X pattern, or in some other pattern.

It will also be appreciated that in applications where grooves extend transverse the compression section as single non-intersecting or non-abutting grooves along the endless path of the belt each tooth and its outside surface may be any suitable rhomboidal-shape, including a rhombus wherein the outermost surface thereof has equilateral sides.

The teeth 33B of the belt 20B have been described as being roughly diamond-shaped. However, as shown, the outside surface of such teeth need not be a pure diamond shape but may be in the form of a polygon having a plurality of sides (six in this example) which are symmetrical about a central plane bisecting the outside surface 51B and extending through a central longitudinal axis of the belt.

The belt of this invention may be made of rubber as shown in the drawing; however, it will be appreciated that such belt need not necessarily be made of rubber but may be made of suitable elastomeric material including synthetic plastic material and in accordance with techniques known in the art.

It will also be appreciated that the belt of this invention need not necessarily have raw-edged sides but may have sides covered with a suitable fabric. Each cover used on the belt of this invention may be made of any suitable material known in the art including woven material, non-woven material, knitted material, so-called stress relieved woven fabric material, and the like.

While the exemplary belts indicate that the grooves are approximately one-half the height of the compression section, this is not a limiting factor. This ratio may be about one-fourth to three-fourths. The grooves have been referred to as being substantially U-shaped, but it should be understood that they may be substantially V-shaped, rectangular, or other appropriate shapes.

It should also be noted that the teeth in the exemplary belts are indicated as being of equal size and configuration, but this also may vary so that they may be of unequal size and of different configurations.

While present exemplary embodiments of this invention, and methods of practicing the same, have been illustrated and described, it will be recognized that this invention may be otherwise variously embodied and practiced within the scope of the following claims.

What is claimed is:

1. A toothed elastomeric endless power transmission belt for operation in an endless path around associated sheaves with minimum noise comprising, a compression section having a plurality of teeth defined by a plurality of grooves in said compression section extending at an angle other than 90° to said endless path, said grooves defining teeth which are adapted to enter and exit each of said associated sheaves gradually during belt operation and said grooves defining associated air-filled columns each of which due to its angular disposition is gradually covered and exposed as the column respectively enters and exits each of said associated sheaves during said belt operation resulting in said minimum noise 2. A belt as set forth in claim 1 in which said teeth are of substantially equal size and have a given pitch along said endless path.

3. A belt as set forth in claim 1 in which said grooves extend inwardly from the inside surface of said belt a distance which is a fractional part of the thickness of said compression section.

4. A belt as set forth in claim 1 in which each of said grooves is a substantially U-shaped groove defined by a roughly semicylindrical surface adjoined at opposite edges thereof by a pair of roughly planar surfaces.

5. A belt as set forth in claim 1 in which said grooves define said teeth so that each of said teeth gradually increases in width then gradually decreases in width along said endless path.

6. A belt as set forth in claim 1 in which each of said teeth has a roughly rhomboidal-shaped surface which comprises the inside surface of said belt.

7. A belt as set forth in claim 1 in which said teeth comprise teeth having a roughly diamond-shaped surface which comprises the inside surface of said belt.

8. A belt as set forth in claim 1 and having a raw-edged surface defining its entire inside surface.

9. A belt as set forth in claim 1 and having a cover defining its entire inside surface.

10. A belt as set forth in claim 9 in which said cover is a woven fabric cover and further comprising another cover defining the outside surface of said belt.

11. A belt as set forth in claim 1 in which said grooves and teeth are of equal size, and each groove extends completely across said compression section.

12. A belt as set forth in claim 1 in which said teeth are defined by pairs of intersecting grooves wherein each groove of each pair extends completely across said compression section.

13. A belt as set forth in claim 12 in which the grooves in each of said pairs of grooves intersect in an X pattern.

14. A trapezoidal toothed elastomeric endless power transmission belt for operation in an endless path around associated sheaves with minimum noise comprising, a tension section, a load-carrying section, and a compression section having a plurality of teeth defined by a plurality of grooves in said compression section extending at an angle other than 90° to said endless path, said grooves defining teeth which are adapted to enter and exit each of said associated sheaves gradually during belt operation and said grooves defining associated air-filled columns each of which due to its angular disposition is gradually covered and exposed as the column respectively enters and exits each of said associated sheaves during said belt operation resulting in said minimum noise.

15. A belt as set forth in claim 14 in which said teeth are of substantially equal size and have a given pitch along said endless path and said grooves extend completely across said compression section.

16. A belt as set forth in claim 15 made primarily of a rubber compound.

17. A belt as set forth in claim 15 in which said load-carrying section has a helically wound load-carrying cord.

18. A belt as set forth in claim 15 in which said trapezoidal belt has non-parallel sides which are raw-edged.

19. A belt as set forth in claim 15 in which each of said grooves extends at an optimum angle ranging between 30° and 75° relative to said endless path.

20. A belt as set forth in claim 15 and having a first cover defining its entire inside surface, a second cover defining its entire outside surface, and non-parallel sides free of covers.

* * * * *